United States Patent Office 3,459,850
Patented Aug. 5, 1969

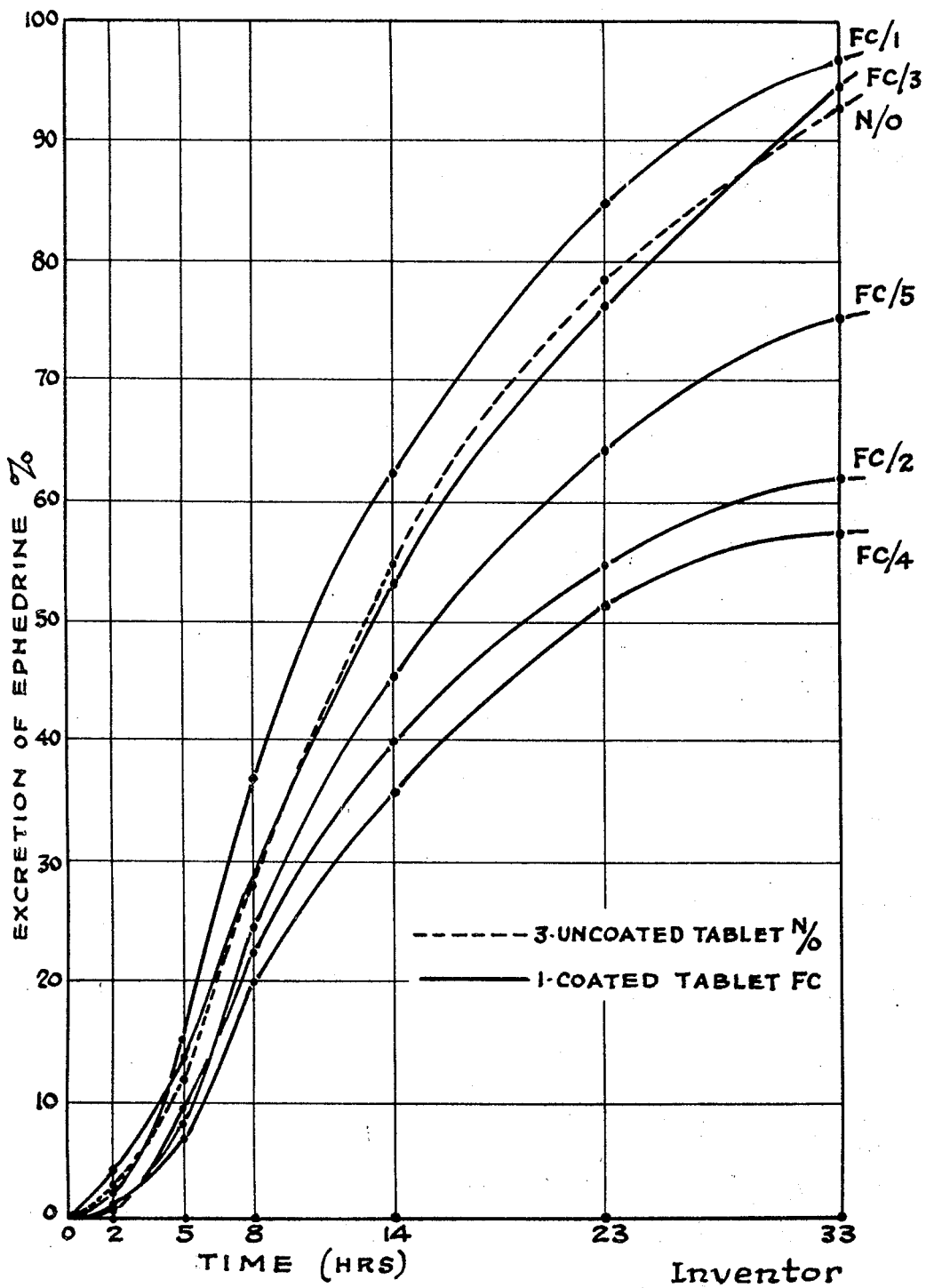

3,459,850
SUSTAINED-RELEASE TABLETS, A PROCESS AND A COMPOSITION FOR THEIR PREPARATION
Aldo Riva, Bern, Switzerland, assignor to Dr. A. Wander, S.A., Bern, Switzerland, a corporation of Switzerland
Filed Aug. 26, 1965, Ser. No. 482,820
Int. Cl. A61k 27/12, 9/00
U.S. Cl. 424—22  5 Claims

ABSTRACT OF THE DISCLOSURE

A sustained-release pharmaceutical tablet formed by integrally mixing a drug component with a digestible fat, an indigestible wax, and a solid polymer which swells when ingested and tableting the resulting mixture. In the preferred embodiment the drug component is initimately mixed with the digestible fat and indigestible wax forming granules with the granules uniformly dispersed throughout the solid polymer which forms a sparingly water soluble carrier for the granules.

A sustained-release tablet having ephedrine hydrochloride as the drug ingredient intimately mixed with hydrogenated castor oil as the digestible fat and carnauba wax or white wax as the indigestible wax to form the granules with the granules dispersed through a minor proportion of "Carbopol 934" as the solid polymer provides a prolonged high level therapeutic activity level for ephedrine.

---

One problem which is known to attend to oral administration of medicaments is the maintenance of a therapeutic activity level over a specific period. A commonly used method of treatment comprises administering separate, fairly small doses at regular intervals. In this case, the increase in the activity level produced by the new dose counteracts the decrease in the activity level of the preceding dose. Unfortunately, this method of treatment is attended by the disadvantage that the tablets have to be taken, for example even during the night, in consequence of which the patient's sleep is disturbed. Such periodic administration of medicaments, however, can also result in a considable fluctuation in the activity level which in turn can result in harmful side-effects. In order at least to reduce the frequency of periodic administration by lengthening the intervals between separate doses of active substance, so-called sustained-release tables, i.e. tablets with a protracted effect, are used. In this case, there is basically a choice of three different methods:

(1) The active substances which are to be released as an additional dose or, generally, as the second dose, are enveloped in a coating which retards the release of the active substances into the digestive tract, whilst the non-coated active substance component is immediately released. Unfortunately, tablets of this kind are attended by the disadvantage that it is not possible by means of modern coating methods to prepare sufficiently uniform coatings with the result that it is not possible, within economic limits, to obtain tablets which release their active ingredients at regular intervals. In addition, the sojourn times of the tablets in the stomachs of some patients are considerably shorter or longer than the average of some two to three hours which in turn accelerates or retards the secondary doses and hence displaces the level from the desired range.

(2) The active substance is mixed with various substances, for example with synthetics, fats, waxes, etc. which inhibit its release. Unfortunately, this method has so far been attended by the disadvantage that the choice of the particular material to inhibit release can present considerable difficulties as regards its suitability with respect to the active substance.

(3) The active substance is chemically modified in such a way that its release and resorption is thereby controlled. A major disadvantage of this method is that it is not easy chemically to modify all active substances so that, in effect, new methods of modification have to be developed for each active substance.

One disadvantage common to all these methods is the need to adapt the method of protraction to the particular active substance.

In order to be able to prepare a medicament in protractable form, the following two quantities must above all be known:

(1) The initial dose of active substance required to produce a therapeutic level.

(2) The so-called biological half-life of the active substance, i.e. the time in which the organism is freed from the physiological effect of half the amount of active substance present by excretion from the biological system in unchanged form, or by inactivating the active substance.

It is possible to calculate from these data the excretion constant (also called the inactivation constant) and also the total amount of active substance required to obtain a desired therapeutic level over a desired period. This may be done in accordance with the following formulae:

(1) $K = 0.693/t\frac{1}{2}$ (2) $W_t = W_0 + K \cdot W_1 \cdot h$

In these formulae:

$t\frac{1}{2}$ = biological half-life of the active substance
$K$ = excretion constant
$W_0$ = initial dose required to obtain a therapeutic level
$h$ = duration of the required therapeutic level in hours
$W_t$ = total dose required to produce the desired therapeutic level during time $t$ As already mentioned, there are several different methods of obtaining the protracted effect, their use being governed by different factors. For example, the biological half-life may vary considerably from one active substance to another, for example 23 seconds in the case of adrenalin and 2½ years in the case of certain organic iodine compounds, so that the particular method of delaying release has to be adapted accordingly to the active substance.

Basically, there are two methods of testing the effectiveness of protracted release, namely the artificial method, i.e. in vitro, and the natural method, i.e. in vivo. At the same time, the different methods of determination available have to be taken into consideration, for example determining the concentration of active substance in the blood, plasma or urine, evaluating the results of clinical tests, etc.

The invention relates to sustained-release tablets, to a process and to a composition for their preparation. Although, as expected, the tablets according to the invention produce the same results in vitro as tablets prepared by known methods with corresponding retarding agents, they produce, quite unexpectedly, a considerably better and more readily controllable protraction effect in vivo.

In vivo tests on human patients have confirmed that a protracted effect can be obtained by adding to the active substance a combination consisting of a digestible fat, an indigestible wax and a high molecular weight polymer material which is swollen very considerably by the digestive juices and which at most is sparingly soluble in water, or by treating the active substance with these agents.

The invention accordingly relates to a tablet which is distinguished by the fact that, in order to retard the release of the active substance, it contains a combination consisting of a digestible fat, an indigestible wax and a high molecular weight, swellable polymer.

The invention also relates to a process for the preparation of tablets, comprising intimately mixing the fat and wax with the active substance and any other secondary substances, granulating the resulting mixture, mixing the granulate with the polymer and any other tabletting agents, and compressing the resulting mixture.

Finally, the invention relates to a composition for the preparation of tablets which does not contain any active substance and which is distinguished by the fact that it contains a combination consisting of digestible fat, indigestible wax and a high molecular weight polymer material which swells in the digestive juices of the stomach and bowel.

It has been found that, in the tablets according to the invention, the release of active substance is governed by the following factors relating to the composition of the active substances and retarding agents present in the tablet:

(1) The ratio between the total amount of wax/fat and the active substance.

(2) The ratio between the total amount of wax/fat, the polymer and the active substance.

(3) The ratio between the indigestible wax and digestible fat.

(4) The total percentage component of the polymer.

(5) The combination of the preceding factors.

It is possible by varying these factors and their combination to make allowance for the properties of the active substance, with the result that a readily controllable protracted effect is obtained in vivo. The therapeutic activity level may be kept substantially constant, for example, over periods ranging from 8 to 12 hours, because the rate at which the active substance is released can be adapted to the excretion rate.

Although it is possible in the preparation of the tablets according to the invention to granulate the entire mixture, including the fat/wax mixture and the polymer, and then to compress it into tablet form, it has been found that, in this case, the effect of the polymer is, in most cases, partly lost. For this reason, the process according to the invention preferably comprises mixing the molten fat/wax mixture with the active substance and, if desired, with excipients, cooling the resulting mixture, grinding it in the usual way with neutral substances, followed by granulation, preferably in the presence of an alcoholic solution of binder, for example, methyl cellulose dissolved in ethyl alcohol. The resulting granulate is then intimately mixed with tabletting agents, for example, talcum, maize starch, stearic acid, magnesium stearate, etc. and with the polymer, and the resulting mixture compressed into tablets.

Suitable fats and waxes include all those materials which are miscible with the active substance or with one another, and produce miscible melts. For example, hydrogenated castor oil (so-called castor wax) is used to advantage as the digestible fat. Carnauba wax and white wax are preferably used as the indigestible waxes. It would, of course, be possible to use several waxes or fats in combination with one another. One example of a suitable high molecular weight polymer is high molecular weight polyacrylic acid and its derivatives, for example, the product marketed by Goodrich under the name "Carbopol," more particularly "Carbopol 934," or, for example, the copolymer of methylvinyl ether and maleic anhydride.

The tablets according to the invention may, of course, be prepared in any desired form, although the so-called coated tablets are preferred. In tablets of this kind, the coating contains active substance in a non-retarded form as the initial dose to reach the required activity level, whilst the core contains active substance as well as the retarding mixture in accordance with the invention in order thus to maintain the level reached.

Example

A coated tablet of the following composition was used for the tests described in this example.

| Coating: | Mg. |
| --- | --- |
| Theophylline | 150 |
| Ephedrine hydrochloride | 5 |
| Caffeine | 50 |
| Allobarbital | 30 |
| Emetine hydrochloride | 0.4 |
| Core: | |
| Ephedrine hydrochloride | 30 |

The core of the tablet contains the ephedrine hydrochloride in protracted form, whilst the coating contains the other active substances. The tests in vivo on human patients with this tablet were carried out by the urine comparison method of K. R. Heimlich, D. R. MacDonnell, T. L. Flanagan and P. D. O'Brien, Journal of Pharmaceutical Sciences, vol. 30, No. 3, March 1961, pp. 232–7. The retarding properties of the tablets were determined by these methods by comparing the amount of ephedrine excreted in the urine following the administration of one coated tablet with sustained action with the amount excreted after the administration, in three parts, of the same total amount of active substance in the form of normal tablets administered at four-hourly intervals. In other words, the patient was given a coated tablet with sustained action at 8 a.m., or a normal tablet containing one third of the dose of the coated tablet at 8 a.m., midday and at 4 p.m. Urine specimens were taken 2, 5, 8, 14, 23 and 33 hours after the first tablet had been taken. The excreted ephedrine was analytically detected in the urine. In order to carry out these investigations, the following tablets were prepared.

(A) Tablet N/0 (normal form, no protracted effect, ⅓ the dose of the coated tablet):

| | G. |
| --- | --- |
| Theophylline | 50 |
| Ephedrine hydrochloride | 11.7 |
| Caffeine | 16.7 |
| Allobarbital | 10 |
| Emetine hydrochloride | 0.133 |
| Saccharose | 6.7 |
| Lactose | 8.3 |
| Maize starch | 3.5 |
| Gum arabic | 0.8 | are mixed thoroughly together and then granulated through a No. 20 screen with 10 ml. of a solution consisting of 2 parts of water, 1 part of sugar syrup, 83° R. and 1 part of a 33% solution of gum arabic. The granulate is dried at 40° C. and then compressed into 0.125 g. tablets with

| | G. |
| --- | --- |
| Stearic acid | 2.8 |
| Magnesium stearate | 1 |
| Maize starch | 6 |
| Talcum | 4.1 |

(B) Coated tablet with a protracted effect:

(1) The composition of the coating of these sustained-release tablets is the same for all the forms examined. It is prepared as follows—

| | G. |
| --- | --- |
| Ephedrine hydrochloride | 50 |
| Allobarbital | 300 |
| Theophylline | 1500 |
| Caffeine | 500 |
| Emetine hydrochloride | 4 |
| Lactose | 361 |
| Maize starch | 95 |
| Polyvinyl pyrrolidone | 100 |
| Stearic acid | 80 | are mixed thoroughly together, the resulting mixture sifted through a No. 50 screen, mixed with 420 ml. of a solution consisting of 1 part of "Eudragit E" (a registered trademark of Rohm & Haas) and 2 parts of ethyl alcohol, and then granulated through a No. 14 screen. After drying at 40° C., the resulting granulate is mixed with 118 g. of stearic acid, 179 g. of maize starch and 95 g. of talcum, and the resulting mixture pressed on to the cores.

(2) "Carbopol 934" (a registered trademark of Goodrich) was used as the polymer in the preparation of the cores with a protracted effect. The following possibilities were investigated:

(a) Influence of the composition of the fat/wax mixture, (b) Influence of the Carbopol component, (c) Influence of the fat/wax component.

The following core granulates were therefore prepared for the coated tablets.

Coated tablet FC/1, FC/2, FC/3

Fat/wax:ephedrine hydrochloride ratio=2:3.
Fat/wax:"Carbopol":ephedrine hydrochloride ratio= 10:6:15.
"Carbopol"/ephedrine hydrochloride ratio=0.4:1.
Percentage of "Carbopol" per core=9.6%.

These ratios remained the same for all three types of coated tablet. By contrast, the composition of the fat/wax mixture is as follows:

Tablet FC/1—hydrogenated castor oil:white wax=3:1.
Tablet FC/2—hydrogenated castor oil:carnauba wax= 1:3.
Tablet FC/3—hydrogenated castor oil:carnauba wax= 1:1.

The composition of the cores is given in the following table:

|  | FC/1 | FC/2 | FC/3 |
|---|---|---|---|
| Components of the cores in mg.: |  |  |  |
| Ephedrine hydrochloride | 30 | 30 | 30 |
| Hydrogenated castor oil | 15 | 5 | 10 |
| White wax | 5 |  |  |
| Carnauba wax |  | 15 | 10 |
| Calcium sulphate | 25 | 25 | 25 |
| Magnesium stearate | 15 | 15 | 15 |
| Colloidal silicic acid | 10 | 10 | 10 |
| Ethyl cellulose | 5 | 5 | 5 |
| "Carbopol 934" | 12 | 12 | 12 |
| Magnesium stearate | 4 | 4 | 4 |
| Talcum | 4 | 4 | 4 |
| Total | 125 | 125 | 125 |

The granulate is prepared as follows: the fat/wax mixture is melted on a steam bath. The finely ground ephedrine hydrochloride which has been sifted through a No. 70 screen is introduced into and then stirred with the melt until a homogeneous mixture is obtained. After cooling, the mixture is finely ground through a No. 60 screen. The ground mixture is then mixed with calcium sulphate, colloidal silicic acid and magnesium stearate, and granulated with a solution of the ethyl cellulose in alcohol through a No. 16 screen. The granulate is mixed with "Carbopol 934," magnesium stearate, talcum and then compressed.

The coated tablet is prepared on a conventional machine: weight of core=125 mg., weight of coating=340 mg., total weight of the coated tablet=465 mg. Compressive strength of the coated tablet=approx. 9.5 kg.

Coated tablet FC/4

Fat/wax:ephedrine hydrochloride ratio=2:1.
Fat/wax:"Carbopol":ephedrine hydrochloride ratio= 10:2:5.
"Carbopol":ephedrine hydrochloride ratio=0.4:1.
Percentage "Carbopol" per core=approx. 9.6%.
Composition of the fat/wax mixture, i.e. hydrogenated castor oil:carnauba wax=1:1.

The cores have the following composition:

|  | Mg. |
|---|---|
| Ephedrine hydrochloride | 30 |
| Hydrogenated castor oil | 30 |
| Carnauba wax | 30 |
| Calcium sulphate | 15 |
| Magnesium stearate | 9 |
| Colloidal silicic acid | 6 |
| Ethyl cellulose | 5 |
| "Carbopol 934" | 14 |
| Magnesium stearate | 3 |
| Talcum | 3 |

Total weight of the cores=145 mg., total weight of the coated tablet=485 mg.

Coated tablet FC/5

Fat/wax:ephedrine hydrochloride ratio=2:3.
Fat/wax:"Carbopol":ephedrine hydrochloride ratio= 10:12:15.
"Carbopol":ephedrine hydrochloride ratio=0.8:1.
Percentage "Carbopol" per core=19.2%.
Composition of the fat/wax mixture, i.e. hydrogenated caston oil:carnauba wax=1:1.

The cores have the following composition:

|  | Mg. |
|---|---|
| Ephedrine hydrochloride | 30 |
| Hydrogenated castor oil | 10 |
| Carnauba wax | 10 |
| Calcium sulphate | 20 |
| Magnesium stearate | 10 |
| Colloidal silicic acid | 9 |
| Ethyl cellulose | 5 |
| "Carbopol 934" | 25 |
| Magnesium stearate | 3.5 |
| Talcum | 3.5 |

Weight of the cores=125 mg., total weight of the coated tablet=465 mg.

The results which were obtained as a result of test in vivo on human patients are given in the following table expressed as the total amount of ephedrine released in percent, and are illustrated in the drawing.

|  | Type of tablet | | | | | |
|---|---|---|---|---|---|---|
|  | N/0 | FC/1 | FC/2 | FC/3 | FC/4 | FC/5 |
| Excretion after— |  |  |  |  |  |  |
| 2 hours | 2.7 | 2.4 | 0.63 | 3.93 | 1.0 | 0.52 |
| 5 hours | 11.95 | 14.5 | 9.0 | 14.08 | 7.3 | 8.51 |
| 8 hours | 27.9 | 37.0 | 22.5 | 27.73 | 20.0 | 24.26 |
| 14 hours | 54.4 | 62.5 | 39.3 | 53.33 | 35.48 | 45.67 |
| 23 hours | 78.1 | 84.8 | 54.6 | 76.23 | 50.86 | 64.04 |
| 33 hours | 92.8 | 97.0 | 61.6 | 94.48 | 57.32 | 75.1 |

These results show that the coated tablet FC/3 has the best protracted effect. It may be regarded as extremely good because its ephedrine excretion curve is practically the same as that obtained in the test using 3 normal tablets. Consequently, the conditions selected in this formulation FC/3 for producing the portracted effect may be regarded as the most suitable for the ephedrine hydrochloride. The release of ephedrine is governed by the following factors:

The ratio between the fat/wax mixture and the ephedrine hydrochloride.

The percentage content of "Carbapol" in the core.

The composition of the fat/wax mixture.

Thus:

(a) Any increase in the fat/wax mixture content is accompanied by a decrease in the amount of ephedrine released;

(b) Any increase in the "Carbopol" content is also accompanied by a decrease in the amount of ephedrine released;

(c) Any change in the ratio between fat (digestible) and wax (indigestible) in the sense of an increase in the wax component is again accompanied by a decrease in the amount of ephedrine released.

We claim:
1. A process of perparing a sustained-release uncoated core pharmaceutical tablet consisting of the steps of melting the mixture of hydrogenated castor oil, digestible fat and indigestible white and/or carnauba wax, stirring into the resulting melt a solid therapeutic agent, along with conventional excipients to facilitate granulation until a homogeneous molten mixture is obtained, cooling the resulting molten mixture, finely grinding the cooled mixture, forming granules from the resulting mixture in an alcoholic solution of methyl or ethyl cellulose, mixing the said granules intimately with acid carboxyvinyl polymer material and with conventional tableting agents to facilitate tableting, and comprising the resulting mixture to form uncoated core tablets.

2. A sustained-release pharmaceutical tablet prepared in accordance with claim 1, comprising a sustained-release component consisting thereof, as the essential ingredients, a solid therapeutic agent present in an amount comprising at least an oral therapeutic dose thereof uniformly distributed in a homogeneous mixture of a hydrogenated castor oil digestible fat and an indigestible white and/or carnauba wax in the form of granules which are intimately dispersed in a minor proportioning of a pharmaceutically acceptable solid high molecular weight acid carboxyvinyl polymer material which is swellable when ingested forming a sparingly water soluble carrier for said granules, wherein the weight ratio of digestible fat to indigestible wax ranges between about 3 to 1 and 1 to 1, and the weight ratio of said polymer material to the combined weights of said fat and said wax is about 1 to 2.

3. A sustained-release pharmaceutical tablet as in claim 2, wherein the weight ratio of the combined weight of said fat, said wax and said polymer material to said solid therapeutic agent is about 1 to 1.

4. A sustained-release pharmaceutical tablet as in claim 2, wherein said digestible fat is hydrogenated castor oil, said indigestible wax is selected from the group consisting of white wax and carnauba wax, and said polymer material is an acid carboxyvinyl polymer obtained by polymerizing acrylic acid and 0.75 to 2.0% by weight polyallylsucrose.

5. A sustained-release pharmaceutical tablet as in claim 2, wherein said tablet contains carnauba wax as the ingestible wax, hydrogenated castor oil as the digestible fat, and ephedrine hydrochloride as the therapeutic agent, and wherein the ratio of the sum of the weights of the fat and wax components to the ephedrine hydrochloride is about 2:3, the ratio between the weight of said polymer material component and the ephedrine hydrochloride is about 0.4:1 and the combined weight ratio of said fat and said wax to said polymer material to said ephedrine hydrochloric is about 10:6:15, with said tablet containing about 10% by weight of said polymer material.

References Cited

UNITED STATES PATENTS

| | | | |
|---|---|---|---|
| 2,793,979 | 5/1957 | Svedres | 167—82 |
| 2,805,977 | 9/1957 | Robinson et al. | 167—82 |
| 2,875,130 | 2/1959 | Grass et al. | 167—82 |
| 3,065,143 | 11/1962 | Christenson et al. | 167—82 |
| 3,074,852 | 1/1963 | Mayron | 167—82 |
| 3,184,386 | 5/1965 | Stephenson | 167—82 |
| 3,346,449 | 10/1967 | Magid | 167—55 |

LEWIS GOTTS, Primary Examiner

S. K. ROSE, Assistant Examiner

U.S. Cl. X.R.

424—19, 21, 330